United States Patent
Bernholc

(10) Patent No.: US 10,853,793 B2
(45) Date of Patent: Dec. 1, 2020

(54) POINT OF SALE SYSTEM AND METHOD FOR CONTACTLESS PAYMENT

(71) Applicant: PayPal, Inc., San Jose, CA (US)

(72) Inventor: Daniel Bernholc, Stockholm (SE)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/308,944

(22) PCT Filed: Feb. 20, 2018

(86) PCT No.: PCT/SE2018/050163
§ 371 (c)(1),
(2) Date: Dec. 11, 2018

(87) PCT Pub. No.: WO2018/174773
PCT Pub. Date: Sep. 27, 2018

(65) Prior Publication Data
US 2020/0210991 A1    Jul. 2, 2020

(30) Foreign Application Priority Data
Mar. 20, 2017 (SE) ...................................... 1750327

(51) Int. Cl.
*G06Q 20/32* (2012.01)
*G06Q 20/18* (2012.01)
(Continued)

(52) U.S. Cl.
CPC ......... *G06Q 20/3278* (2013.01); *G06Q 20/18* (2013.01); *G06Q 20/204* (2013.01); *G06Q 20/352* (2013.01); *G06Q 20/4012* (2013.01)

(58) Field of Classification Search
CPC ........................... G06Q 20/3278; G06Q 20/18
See application file for complete search history.

(56) References Cited

U.S. PATENT DOCUMENTS

| | | |
|---|---|---|
| 2010/0161434 A1 | 6/2010 | Herwig et al. |
| 2012/0135681 A1 | 5/2012 | Adams et al. |

(Continued)

FOREIGN PATENT DOCUMENTS

| | | |
|---|---|---|
| WO | 2003/073201 A2 | 9/2003 |
| WO | 2015/184114 A1 | 12/2015 |

OTHER PUBLICATIONS

International Search Report and Written Opinion received in corresponding International Application No. PCT/SE2018/050163 dated Jun. 19, 2018.

(Continued)

*Primary Examiner* — A. Hunter Wilder

(57) ABSTRACT

A point of sale [POS] system for contactless payment of products, including a payment processing unit for facilitating electronic payment of products based on payment-facilitating information received from a portable payment device, such as a contactless card is provided. The payment processing unit is connected to a plurality of antennas, each associated with a respective product and each configured to read payment-facilitating information from a portable payment device when the portable payment device is brought in the vicinity of the antenna. The payment processing unit is configured to, upon reading of payment-facilitating information by any of the antennas, receive the payment-facilitating information and identify a product to be paid for based on which of the plurality of antennas read the payment-facilitating information, and to facilitate a financial transaction comprising payment of the identified product using the payment-facilitating information.

10 Claims, 7 Drawing Sheets

(51) Int. Cl.
    *G06Q 20/20*     (2012.01)
    *G06Q 20/34*     (2012.01)
    *G06Q 20/40*     (2012.01)

(56) References Cited

U.S. PATENT DOCUMENTS

| | | |
|---|---|---|
| 2013/0110657 A1 | 5/2013 | Forster |
| 2016/0292669 A1 | 10/2016 | Tunnell et al. |
| 2016/0379205 A1 | 12/2016 | Margadoudakis |

OTHER PUBLICATIONS

Swedish Search Report received in corresponding Swedish Patent Application No. 1750327-7 dated Oct. 11, 2017.

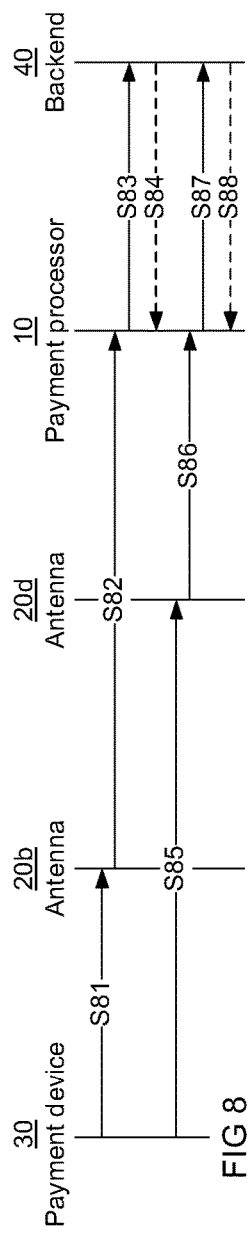
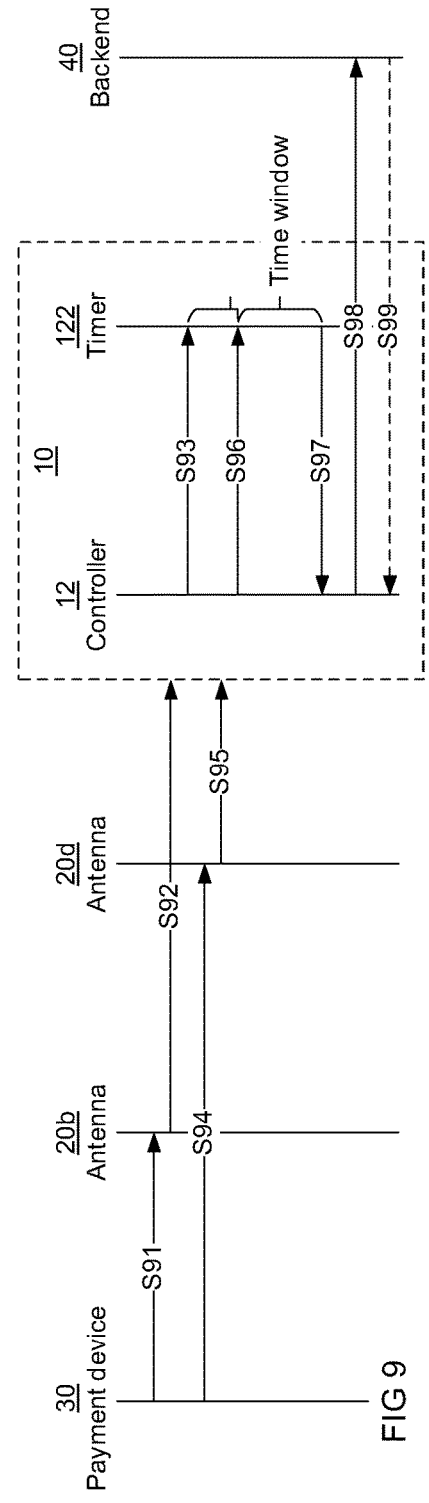
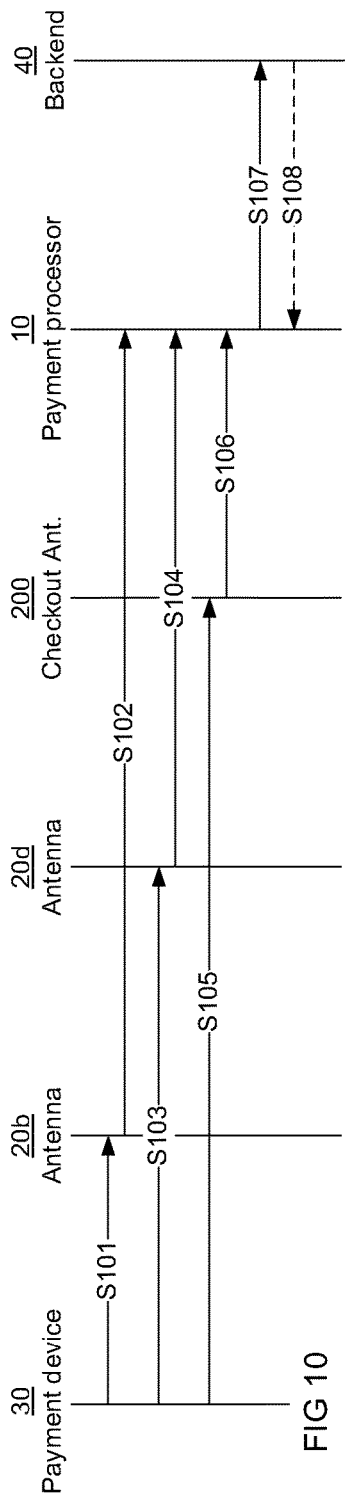
FIG 8
FIG 9
FIG 10

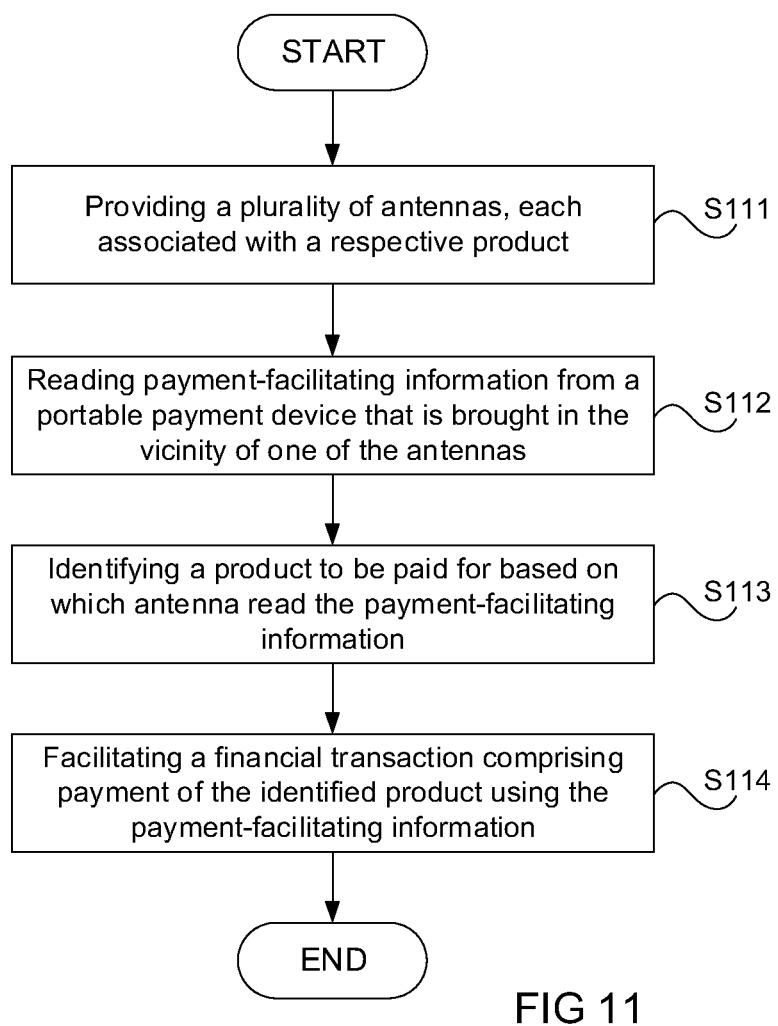

POINT OF SALE SYSTEM AND METHOD FOR CONTACTLESS PAYMENT

This application is a national phase of International Application No. PCT/SE2018/050163 filed Feb. 20, 2018 and published in the English language, and claims priority to Swedish Application No. 1750327-7 filed Mar. 20, 2017, which is incorporated herein by reference.

TECHNICAL FIELD

The disclosure generally pertains to the field of electronic payments and, more particularly, to a point of sale (POS) system for contactless payment of products.

BACKGROUND

A point of sale (POS) system may comprise a computer, monitor, cash drawer, receipt printer, customer display, barcode scanner, and one or more readers for reading payment-facilitating information from a portable payment device, such as a credit card or a mobile wallet of an electronic communication device, e.g., a mobile phone. The computer that processes the payment-facilitating information and facilitates the payment of the products to the paid for is sometimes referred to as the payment processing unit, or the POS terminal. To facilitate payment, most POS terminals are connected to a backend payment system, typically including a payment gateway, a payment processor, a credit card network, an acquiring bank and an issuing bank.

Most POS terminals include card readers for processing chip cards that are inserted into the card reader. Some POS terminals also process magnetic stripe cards that are swiped through a slot in the card reader. The customer is often required to enter a Personal Identification Number, PIN, on a keypad of the POS terminal for the purpose user authentication.

Recent POS terminals also provide support for contactless payments using a short distance wireless technology, such as Near Field Communication (NFC) or Radio Frequency Identification (RFID), for communicating with the credit card. As of today, NFC, which allows for wireless communication between two devices in close proximity to each other, is probably the most viable technology for contactless payments.

In contactless solutions, the POS terminal is typically equipped with a short-distance communication antenna configured for converting an electromagnetic signal comprising payment-facilitating data, typically payment card data, received from a contactless payment card or another portable payment device for contactless payments, such as a mobile-wallet enabled mobile phone, into an analogue signal.

The antenna, which defines the "tap zone" where the user needs to tap his payment card, is traditionally placed on a card reader terminal integrated in the POS terminal. Generally, POS terminals have a delimited area where customers must tap their cards or payment devices to achieve a successful reading. This area is normally referred to as the tap zone or landing zone of the POS terminal. The tap zone must be a clearly distinguishable area on the POS terminal and the contactless symbol should be placed in the centre of the tap zone. Typically, POS terminals supporting contactless payments include a cardholder-facing surface comprising visual status indicators, such as LEDs, and/or a beeper for indicating successful reading of a payment card or another portable payment device to the user.

However, a tap zone located on the POS terminal may be difficult to reach by the user of the portable payment device. Furthermore, besides making the payment process a bit more convenient to customers by allowing payment cards to be tapped against the card reader of the POS terminal instead of being swiped through, or inserted into, the card reader, existing POS terminals for contactless payments do not really render shopping or the process of paying for goods or services more effective than traditional POS terminals for non-contactless payment.

In particular at point of sales where customers are offered a rather small selection of products, for example at fast food restaurants or in automatic vending machines, the traditional way of ordering and paying for products is often inconvenient and time consuming.

SUMMARY

It is an object of the present disclosure to provide a POS system and method of payment that solves or mitigates at least some of the above mentioned problems of POS systems according to prior art.

In particular, it is an object of the present disclosure to provide a POS system and method of payment for goods and/or services that is convenient and time efficient for the paying customer.

It is another object of the present disclosure to eliminate the need for cashier-staffed checkouts at certain types of point of sales, or at least facilitating an automatic checkout procedure.

Yet another object of the present disclosure is to provide a cost-efficient and secure POS system and method of payment for goods and/or services.

According to a first aspect of the present disclosure, these and other objects, which will become apparent from the detailed description following hereinafter, are achieved by a POS system for contactless payment of products, comprising a payment processing unit for facilitating electronic payment of products based on payment-facilitating information received from a portable payment device, such as a contactless credit or debit card. The payment processing unit is connected to a plurality of antennas, each associated with a respective product and each configured for contactless reading of the payment-facilitating information from the portable payment device when the portable payment device is brought in the vicinity of the antenna. The payment processing unit is configured to receive payment-facilitating information read by any of the antennas, and to identify a product to be paid for based on which of the plurality of antennas read the payment-facilitating information. When the product is identified, the payment processing unit is configured to facilitate a financial transaction comprising electronic payment of the identified product using the payment-facilitating information.

Consequently, the proposed POS system allows a customer to select one of a plurality of products that are offered for sale, and to pay for the selected product, simply by tapping a tap zone associated with the product with his portable payment device. Furthermore, it allows different customers to pay for different products simultaneously. This convenient and time-efficient way of shopping or buying products will herein be referred to as "tap-to-buy".

The POS system may be configured to identify the product to be paid for in different ways. In some exemplary embodiments, the payment processing unit may be configured to identify the product to be paid for based on an identity of an antenna input port on which the payment-facilitating information is received. In this case, the payment processing unit may comprise a plurality of antenna input ports for connection of the payment processing unit to different antennas, and the POS system may comprise a software application through which the user, e.g., a merchant, is enabled to associate the different antenna ports of the payment processing unit with a respective product to be offered for sale at the point of sale. This provides a flexible and customizable POS system that can be adapted to the needs of different merchants and their range of products.

In other exemplary embodiments, the payment processing unit may be configured to identify the product to be paid for based on characteristics or content of a signal carrying the payment-facilitating information from the antenna to the payment processing unit.

When and how the electronic payment of identified products should be initiated may be adjusted to the intended use of the POS system. For example, the payment process may depend on the type of products offered for sale, and the expected purchase behaviour of the paying customers.

In some embodiments, the POS system may be configured for a "pay-per-tap" payment process where the financial transaction comprising the payment of the identified product is initiated by the payment processing unit directly upon reception by the payment processing unit of payment-facilitating information from any of the plurality of antennas.

In other embodiments, the POS system may be configured for a "pay-upon-timeout" payment process where the financial transaction is initiated by the payment processing unit upon expiry of a timer that is started or restarted upon reception by the payment processing unit of payment-facilitating information from any of the plurality of antennas.

In yet other embodiments, the POS system may be configured for a "pay-upon-checkout" payment process where the financial transaction is initiated by the payment processing unit upon reception by the payment processing unit of payment-facilitating information from an antenna constituting a checkout antenna of the POS system.

By configuring the payment processing unit to initiate the financial transaction only upon expiry of the timer, or only upon reception of the payment-facilitating information from a dedicated checkout antenna of the POS system, a plurality of purchased products can be paid for simultaneously, through a single financial transaction. By allowing a plurality of selected products to paid for through a single financial transaction, the need for transmitting the payment-facilitating information multiple times over a payment-facilitating network is eliminated, thereby increasing security and reducing network resource utilization. Furthermore, it improves the customer experience by preventing a vast amount of small financial transactions from the same purchase occasion to appear in the customer's bank account transaction history.

The payment processing unit may be configured to register a plurality of products selected for purchase by a customer by comparing payment-facilitating information received from different antennas of the plurality of antennas, and to initiate a single financial transaction comprising electronic payment of all the registered products. In this way, a "virtual shopping cart" can be created for each customer, and all products in the shopping cart can be paid for through a single financial transaction.

The antennas of the POS system may be connected to the payment processing unit through physical feed lines, via which the payment-facilitating information is sent to the payment processing unit. The antennas may be configured to send analogue signals carrying the payment-facilitating information to the payment processing unit via the physical feed lines, and the payment processing unit may comprise an analogue-to-digital (A/D) converter for digitizing the analogue signals, located in a secure area of the payment processing unit. In this way, a secure arrangement where digitisation of sensitive payment-facilitating information takes place within a secure area of the payment processor is provided.

Optionally, the payment processing unit may be configured for user authentication, for example through a PIN verification process.

The payment processing unit (and the portable payment device) may advantageously be configured to facilitate a financial transaction in form of an EMV transaction, meaning that the financial transaction fulfils the requirements of the EMV (Europay, Mastercard, Visa) standard.

The portable payment device may be a contactless card, such as a contactless debit or credit card, or a mobile communication device adapted for mobile proximity payments, such as a mobile phone. In cases where the POS system is configured for operation with portable payment devices in form of contactless cards, the payment processing unit constitutes a card reader terminal and the plurality of antennas connected to the payment processing unit constitutes external card readers of the card reader terminal.

According to a second aspect of the present disclosure there is provided a method for contactless payment of products. The method comprises the steps of:
  providing a plurality of antennas at different locations, each antenna being associated with a respective product;
  reading, when a portable payment device is brought in the vicinity of any of the antennas, payment-facilitating information from the portable payment device with the antenna;
  identifying a product to be paid for based on which antenna read the payment-facilitating information, and
  facilitating a financial transaction comprising payment of the identified product using the payment-facilitating information.

Consequently, the proposed "tap-to-buy" process allows a customer to select and pay for one or more of a plurality of products that are offered for sale simply by tapping a tap zone associated with the product(s) with his portable payment device.

Optionally, the step of identifying the product to be paid for may comprise identifying an antenna input port on which the payment-facilitating information is received by a payment processing unit, and identifying the product to be paid for based on the identified antenna input port.

Optionally, the step of identifying the product to be paid for may comprise analysing a signal carrying the payment-facilitating information from the antenna to the payment processing unit, and identifying the product to be paid for based on characteristics or content of the signal.

As discussed above, the financial transaction comprising the payment of the identified product may be initiated upon any of:
  a) reception, in a payment processing unit, of payment-facilitating information from any of the plurality of antennas;

b) expiry of a timer that is started upon reception of payment-facilitating information from any of the plurality of antennas; and c) reception, in a payment processing unit, of payment-facilitating information from an antenna constituting a checkout antenna.

Option a) may be advantageous at point of sales where the customer is expected to buy one or only a few products, whereas option b) or c) may be advantageous at point of sales where the customer is expected to buy several products. Option c) may be particularly advantageous at point of sales where the user is required to participate in a user authentication process before the financial transaction is initiated, e.g. a PIN verification process.

Optionally, the method may comprise a step of registering a plurality of products selected for purchase by a customer by comparing payment-facilitating information received by the payment processing unit from different antennas of the plurality of antennas, and to initiate a single financial transaction comprising electronic payment of all the registered products. As discussed above, this provides for increased security, reduced network resource utilization, and an improved customer experience compared to a scenario wherein each selected product is paid for through a separate financial transaction.

More advantageous aspects of the POS system and the method of the present disclosure will be described in the detailed description following hereinafter.

BRIEF DESCRIPTION OF DRAWINGS

A more complete appreciation of the invention disclosed herein will be obtained as the same becomes better understood by reference to the following detailed description when considered in conjunction with the accompanying drawings briefly described below, in which drawings the same reference numerals are used to represent corresponding functional elements.

FIGS. 8-10 illustrate different ways of implementing a payment process in the POS system of the present disclosure.

FIG. 11 is a flow chart illustrating a method for contactless payment of products, according to an exemplary embodiment of the present disclosure.

DETAILED DESCRIPTION

Aspects of the present disclosure will be described more fully hereinafter with reference to the accompanying drawings. The system and apparatus disclosed herein can, however, be realized in many different forms and should not be construed as being limited to the aspects set forth herein.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise. Furthermore, it should be noted that the word "comprising" as used herein does not necessarily exclude the presence of other elements or steps than those listed.

Figure 1:
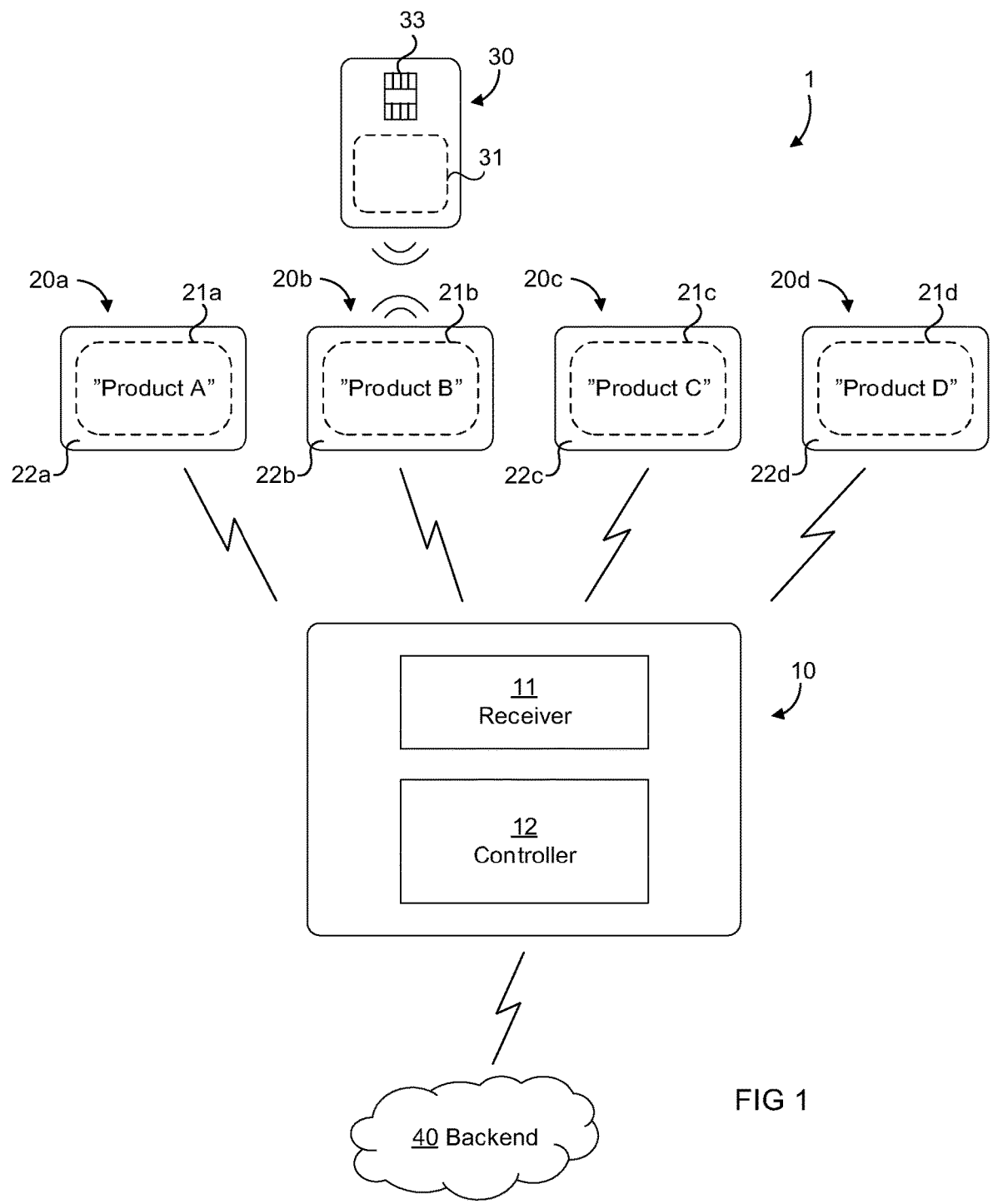
FIG. 1 illustrates schematically a POS system according to an exemplary embodiment of the present disclosure.

FIG. 1 illustrates a POS system 1 comprising a payment processing unit 10, hereinafter sometimes referred to as the payment processor, for facilitating contactless payment of products. In this context, a product may be any type of product, including but not limited to physical products, intangible goods, and services. Donations and gratuities (tip) are examples of intangible goods for which the proposed POS system may be advantageously used.

The payment processor 10 is connected to a plurality of antennas 20a-20d (i.e., two or more) of the POS system, each configured for contactless reading of payment-facilitating information from a portable payment device 30.

The payment-facilitating information typically comprises credit or debit card data but may be any information allowing an electronic financial transaction to be carried out from a payment account associated with the portable payment device 30 to a receiving party, such as an acquiring bank.

The portable payment device 30 is typically a credit or debit card configured for contactless payment but may be any portable payment device 30 capable of wirelessly transmitting payment-facilitating information to an antenna 20a-20d, such as a mobile communication device, e.g. a mobile phone, configured for mobile payment.

The payment processor 10 constitutes a POS terminal for facilitating contactless payment of products using payment-facilitating information received from a contactless card or another portable payment device, which POS terminal is connected to a plurality of antennas 20a-20d constituting external readers, such as external card readers, of the POS terminal.

The POS system 1 is typically configured for proximity payment, meaning that the payment-facilitating information can be read by the antennas 20a-20d from the portable payment device 30 only at short ranges (typically <20 cm), requiring the user to perform a voluntary gesture to bring the portable payment device 30 sufficiently close to any of the antennas 20a-20d for the payment-facilitating information to be read. The communication between the portable payment device 30 and the payment processor 10 takes place through a proximity technology, such as NFC or BLE (Bluetooth Low Energy). Hereinafter, as a non-limiting example, the portable payment device 30 will be assumed to communicate with the payment processor 10, via the antennas 20a-20d, using NFC.

The portable payment device 30 typically comprises a control circuit (not shown) which stores the payment-facilitating information and controls the communication with the payment processor 10 and other external units. Furthermore, the portable payment device 30 typically comprises a short-distance antenna 31 for transmitting the payment-facilitating information to a receiving antenna, e.g. through transmission of radio signals at a frequency of 13.56 MHz, corresponding to the NFC carrier frequency. In the illustrated embodiment, the portable payment device is a contactless card, such as a contactless debit or credit card, comprising a short-distance antenna 31, such as an NFC antenna, for transmitting payment-facilitating information comprising card data to a contactless card reader. The contactless card may further comprise an electronic chip 33 and/or a magnet stripe (not shown) allowing the payment-facilitating information to be read from the card also by card readers comprising chip and/or magnet stripe readers.

As illustrated in the drawing, each antenna 20a-20d of the POS system is associated with a respective product, allowing a customer to buy one or more products simply by tapping one or more antennas with his portable payment device. The antennas 20a-20d are typically short-distance antennas, such as NFC antennas, comprising a respective antenna element 21a-21d for receiving the payment-facilitating information from the portable payment device 30. To indicate to a customer which product is associated with the respective antenna 20a-20d, each antenna 20a-20d may comprise a cover 22a-22d carrying a product image or a text allowing the associated product to be identified by the customer, or be associatively positioned in relation to a product image, text or physical product so as to allow the customer to identify the associated product. In this exemplary embodiment, the POS system comprises four antennas 20a-20d associated with four different products that are offered for sale through the POS system. Of course, the POS system may comprise more or fewer antennas.

When payment-facilitating information is read by any of the antennas 20a-20d, it is transmitted to the payment processor 10 in which it is received and processed by a receiver or receiver circuitry 11, typically including an analogue to digital (ND) converter for converting analogue payment-facilitating information carrying signals from the antennas 20a-20d to digital signals. The payment processor 10 is configured to identify the antenna 20a-20d that read the payment-facilitating information from the portable payment device 30, and to identify a product to be paid for based on the identified antenna. When one or more products to be paid for have been identified by the payment processor 10 upon tapping of one or more of the antennas 20a-20d by the customer, the payment processor 10 facilitates an electronic financial transaction comprising payment of the identified products using the payment-facilitating information read by the one or more antennas from the portable payment device 30.

Consequently, the proposed POS system allows a customer to select one of a plurality of products that are offered for sale, and to pay for the selected product, simply by tapping a tap zone associated with the product with his portable payment device 30. This way of shopping or buying products is hereinafter referred to as "tap-to-buy".

That the payment processor 10 is configured to facilitate an electronic financial transaction comprising payment of the identified product using the payment-facilitating information typically means that the payment processor 10 is configured to at least initiate a financial transaction that results in that the purchase amount, i.e. the price of the identified product, is transferred from an account associated with the payment-facilitating information to a receiving account.

Identification by the payment processor 10 of the antenna that read the payment-facilitating information may be achieved in different ways. In some exemplary embodiments, the payment processing unit 10 may be configured to identify the antenna based on the characteristics or content of the signal carrying the payment-facilitating information, received by the payment processor from the antenna. For example, each of the plurality of antennas 20a-20d may be configured to generate, upon reading of payment-facilitating information from the portable payment device 30, a payment-facilitating information carrying signal that is unique in content or character in relation to signals generated by the other antennas of the POS system 1, whereby the payment processor 10 can extract the payment-facilitating information and identify the antenna from which it was received upon reception of the signal from the antenna. In other exemplary embodiments in which the plurality of antennas 20a-20d are connected to different antenna input ports of the payment processor 10, the payment processor may be configured to identify the antenna that read the payment-facilitating information from the portable payment device 30 based on the antenna input port on which the signal carrying the payment-facilitating information is received.

Once the antenna that read the payment-facilitating information has been identified by the payment processor 10, the product to be paid for can be identified by the payment processor 10 in different ways. Typically, as will be described in more detail below with reference to FIG. 2, the payment processor 10 is configured to store, e.g. in a hardware memory device of the payment processor, information associating each antenna with a respective product, and to identify the product to be paid for by determining which product is associated with the antenna that read the payment-facilitating information.

The payment processor 10 comprises a controller 12, e.g. in form of a control computer. The controller 12 is configured to identify the product to be paid for based on the antenna from which the payment-facilitating information is received, and to facilitate payment of the identified product, typically by transmitting the payment-facilitating information to a backend payment system 40. The backend payment system 40 may, for example, include a payment gateway, a payment processor, a credit card network, an acquiring bank and an issuing bank, connected to each other through a payment-facilitating network, such as the Internet.

Preferably, the portable payment device 30 and the payment processor 10 are EMV-compliant, meaning that they are configured to facilitate payment of the product or products through a process that fulfils the requirements of the EMV standard, see EMV Contactless Specifications for Payment Systems, available via https://www.emvco.com/specifications.aspx (2017-02-24).

The plurality of antennas 20a-20d and the payment processor 10 are configured to communicate with each other over a communication interface that may be wired or wireless.

Preferably, the communication interface is a wired communication interface wherein the antennas 20a-20d are physically connected to the payment processor 10. This allows the complexity and cost of the antennas 20a-20d to be reduced while at the same time providing for improved security since digitisation of the payment-facilitating information can be made within a secure area of the payment processor 10, as will be further described below.

Figure 2:
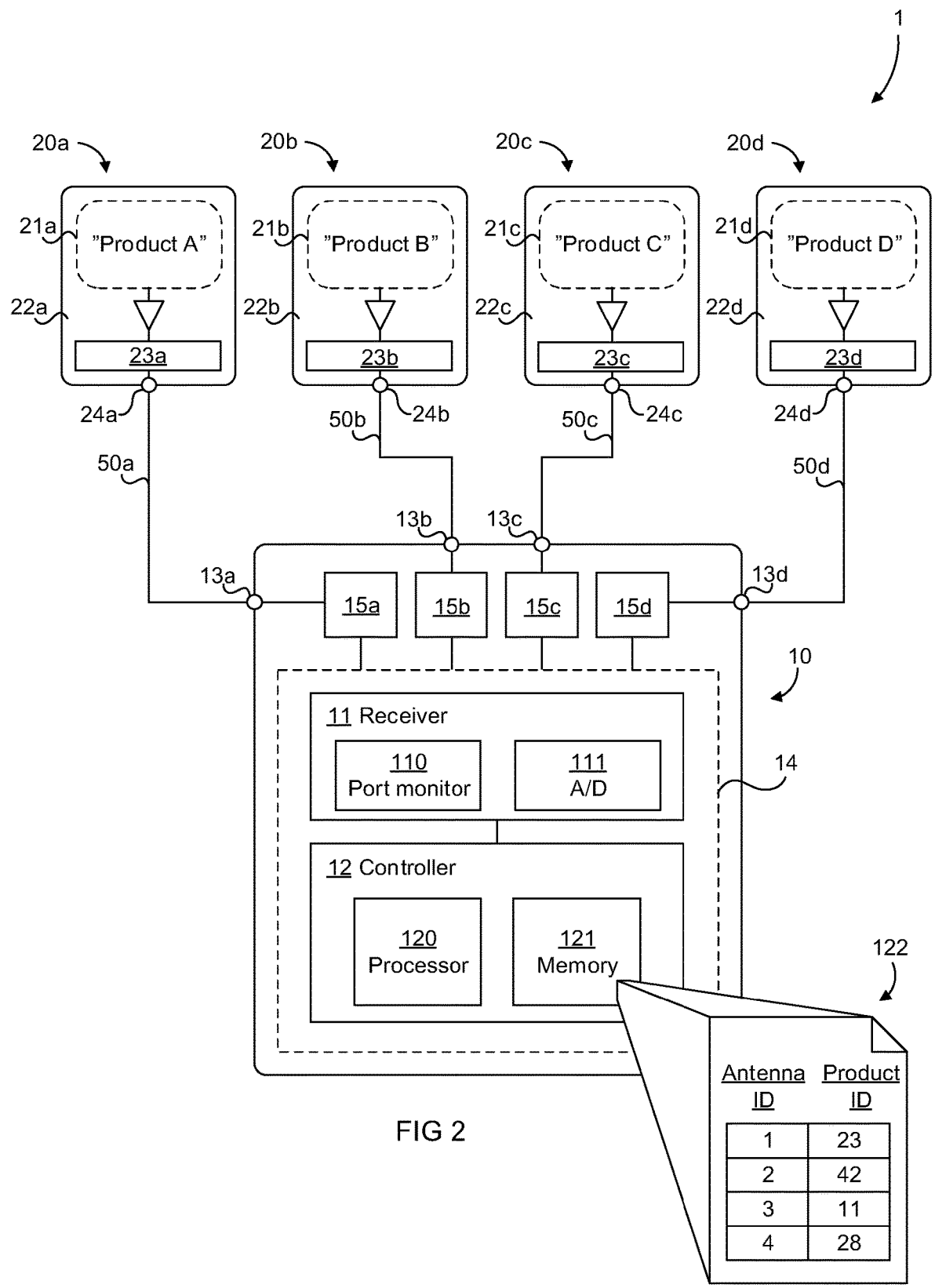
FIG. 2 illustrates schematically a POS system according to another exemplary embodiment of the present disclosure.

FIG. 2 illustrates an exemplary embodiment of a POS system 1 wherein each of the plurality of antennas 20a-20d is connected to a respective antenna input port 13a-13d of the payment processor 10 via a physical feed line 50a-50d, i.e. a signal cable. The POS system 1 is configured such that analogue signals carrying payment-facilitating information, generated by an antenna 20a-20d in response to a tap of the antenna by the portable payment device 30, are allowed to propagate all the way to the payment processor 10, and preferably all the way into a secure area 14 of the payment processor 10, without intermediate digitisation of the analogue signals. In this way, no digital signals comprising card data or other sensitive payment-facilitating information is exposed to signal interception. Consequently, the need for additional encryption is eliminated. The physical feed lines 50a-50d may easily be adapted to isolate the analogue signals between the antennas 20a-20d and the payment processor 10, thereby rendering wiretapping difficult. For example, the physical feed lines 50a-50d may comprise coaxial cables in which the analogue signals are made to propagate between an inner conductor and an insulating layer.

The payment processor 10 comprises a secure area 14 in which the receiver 11 and the controller 12 are located. The secure area 14 may be tamper proof, meaning that it is resistant to tampering (intentional malfunction or sabotage) by a user of the POS system 1 or anyone else with physical access to the payment processor 10. Tamper resistance ranges from simple features like glue or epoxy to more complex devices that render themselves inoperable or encrypt all data transmissions between individual chips, or use of materials needing special tools and knowledge. The payment processor 10 may thus be provided with anti-tamper devices to form a secure area 14 protecting the components of the receiver 11 and controller 12 against physical destruction, as well as destruction and interception of received and stored data.

In order to comply with current standards for contactless payments, signals carrying card data or other payment-facilitating information must be protected against sixteen points attack potential from the point of digitisation of the signals. "Attack potential" is a term that appears often in the documentation published by the PCI Security Standards Council, PCI SSC, and is a numeric value that refers to the security vulnerability of a given piece of equipment. The higher the number, the more secure the device. The proposed arrangement of external antennas 20a-20d connected to a payment processor 10 via physical feed lines, wherein the point of digitisation of the analogue signals obtained by the antennas resides in a secure area 14 within the payment processor 10, can easily be made to fulfil the requirements of a secure arrangement according to existing standards while providing for a high degree of freedom in terms of positioning of the antennas.

In this exemplary embodiment, the receiver 11 comprises a port monitor 110 configured to monitor the antenna input ports 13a-13d and, when a signal is received on one of the ports, to determine which port received the signal. Furthermore, the receiver 11 comprises the A/D converter 111 for digitising the analogue payment facilitating information carrying signals received from antennas 20a-20d that have been tapped by the portable payment device 30.

The controller 12 is configured to identify the antenna that read the payment-facilitating information from the portable payment device 30 as the antenna connected to the antenna input port determined by the port monitor 110, and to identify the product to be paid for based on the identified antenna.

The controller 12 comprises a processor or processing unit 120, typically in form of a microprocessor, and a memory 121 in form of a non-volatile hardware memory device. Actions and method steps performed by the controller 12 are typically controlled by a computer program for contactless payment of products according to the principles described herein, stored in the memory 121. The memory 121 may further store data 122 associating each of the antennas 20a-20d with a respective product. For example, as illustrated in the drawing, the data 122 may be stored in a database or a look-up table in which each antenna, as represented by an antenna ID or an antenna port ID, is associated with a respective product, as represented by a product ID.

The associative links between the antennas 20a-20d and their associated products may be created by an installation engineer when first setting up the POS system 1 for use at the point of sale. To this end, the above mentioned computer program may comprise an administration module allowing a user to create the associative links between the antennas 20a-20d and the products with which they should be associated. Preferably, the administration module is configured to allow an owner of the POS system 1, e.g. a merchant, to change the associative links so as to allow the owner to associate each antenna with a product of his choice, and to change the product associated with a specific antenna at any time, should that be desired.

In order to transfer the often tiny radio voltage induced in an antenna 20a-20d in response to a tap of the antenna by the payment device 30, impedance matching may be used. Impedance matching is the practice of designing the input impedance of an electrical load or the output impedance of its corresponding signal source to maximize the power transfer or minimize signal reflection from the load. The impedance matching may, for example, be performed by antenna matching circuits forming a matching network that takes into account the impedance of source and load as well as the frequencies that are used. Consequently, the POS system may be provided with at least one antenna matching circuit for matching the frequency characteristics of the antennas 20a-20d with the frequency characteristics of the feed lines 50a-50d and/or connection points of the feed lines. Preferably, an antenna specific matching circuit is positioned between the antenna element 21a-21d of each antenna and the A/D converter 111 of the payment processor 10. In the exemplary embodiment illustrated in FIG. 2, antenna matching circuits 15a-15d and 23a-23d are positioned on both sides of each physical feedline 50a-d connecting an antenna with the payment processor 10.

In some embodiments, each antenna 20a-20d comprises an antenna matching circuit 23a-23d located in the antenna 20a-20d, e.g. inside an antenna cover 22a-22d housing both the antenna element 21a-21d and the matching circuit 23a-23d of the respective antenna. Each antenna matching circuit 23a-23d is adapted to match the frequency characteristics of the antenna element 21a-21d with frequency characteristics of the feed line 50a-50d connecting the antenna element with the payment processor 10, or with frequency characteristics of the feed line in combination with frequency characteristics of the antenna input port 13a-13d connecting the physical feed line with the payment processor 10. Instead of, or in addition to, the antenna matching circuits 23a-23d located in the antennas 20a-20d, antenna matching circuits 15a-15d may be located in the payment processor 10. For example, the payment processor 10 may comprise one antenna matching circuit 15a-15d for each antenna 20a-20d. In this case, each antenna matching circuit 15a-15d may be adapted to match the frequency characteristics of the respective feed line 50a-50d in combination with the frequency characteristics of a connection point 24a-24d of the feed line in the antenna, with the frequency characteristics of the antenna input port 13a-13d constituting the connection point of the feed line in the payment processor 10.

In some embodiments (not shown), the payment processor 10 may further comprise a switch or switch arrangement for switching between the different antennas 20a-20d. For example, the payment processor 10 may comprise a switch arrangement located between the antenna input ports 13a-

13*d* and the receiver 11, for example between the antenna matching circuits 15*a*-15*d* and the receiver 11. The switch arrangement may be configured to enable reception of signals by the receiver 11 from one antenna at a time. In an exemplary embodiment, the payment processor 10 may be configured to identify the antenna from which payment-facilitating information is received based on a current state of the switch arrangement, which state is indicative of the antenna input port on which the signal carrying the payment-facilitating information was received.

Figure 3:
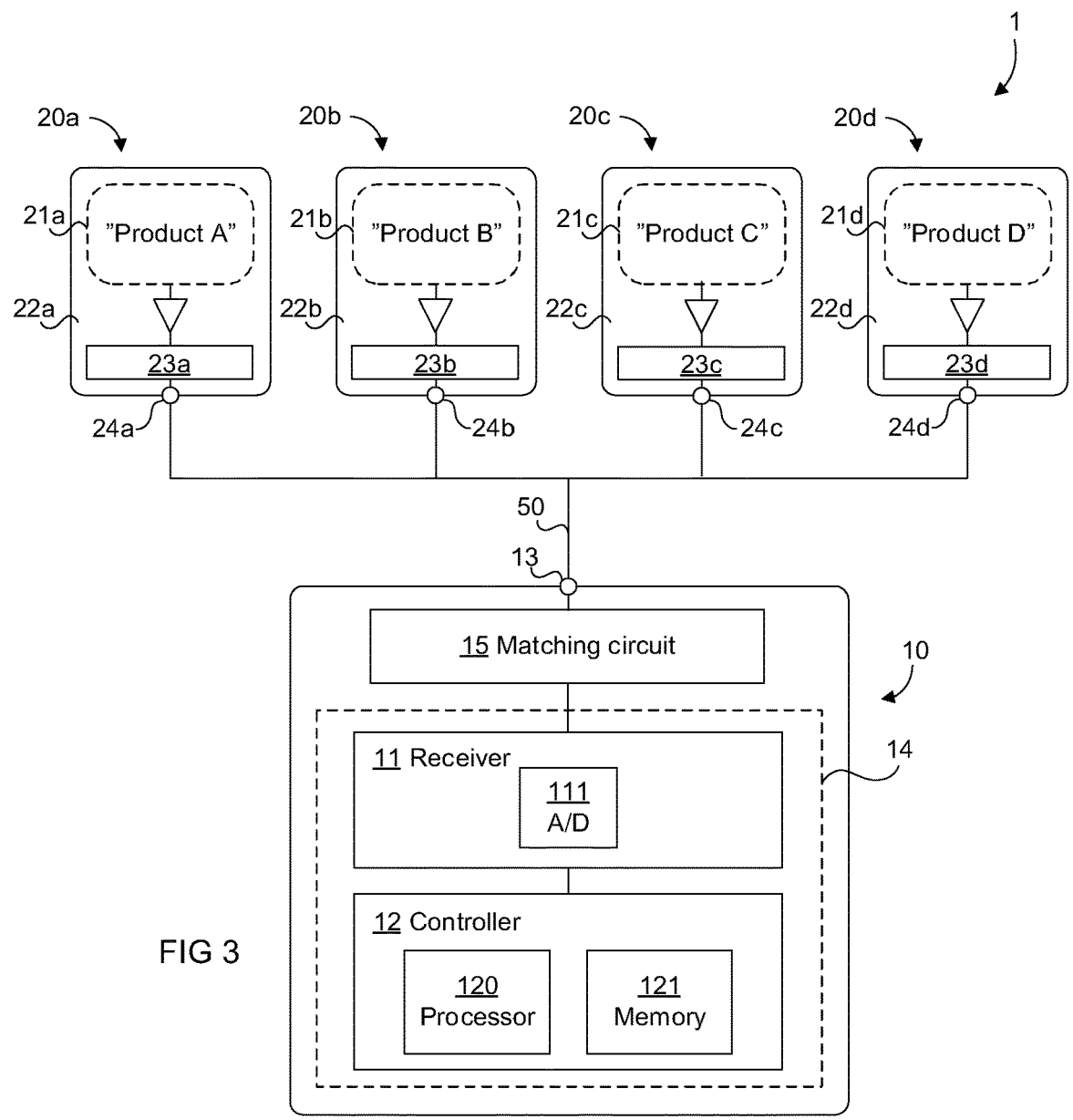
FIG. 3 illustrates schematically a POS system according to yet another exemplary embodiment the present disclosure.

FIG. 3 illustrates another exemplary embodiment of a POS system 1 wherein all antennas 20*a*-20*d* are connected to a common antenna input port 13 of the payment processor 10, via a common physical feedline 50. In this embodiment, the controller 12 cannot determine which antenna has read the payment-facilitating information based on the antenna input port on which the signal carrying the payment-facilitating information is received. Instead, the controller 12 may be configured to identify the antenna based on the characteristics or content of the signal itself. For example, each antenna 20*a*-20*d* may be configured to generate a payment facilitating information carrying signal that is unique in character in response to a tap of the antenna by the portable payment device 30. The controller 12 may in turn be configured to identify the antenna from which the signal is received by analysing the characteristics of the signal. When the characteristics of the signal is analysed, the controller 12 may retrieve an antenna identifier ("Antenna ID") from a database or a look-up table in which the antennas 20*a*-20*d* are associated with characteristics of signals generated by the respective antenna. In an alternative implementation, each antenna 20*a*-20*d* comprises circuitry (not shown) acting as an antenna ID marker, configured to add antenna-specific information allowing the payment processor 10 to identify the antenna that has been tapped by the portable payment device 30 to the signal carrying the payment-facilitating information. Once the antenna that has read the payment-facilitating information has been identified by the controller 12 of the payment processor 10, the controller can identify the product to be paid for and initiate a financial transaction comprising electronic payment of the product, as described above.

Figure 4:
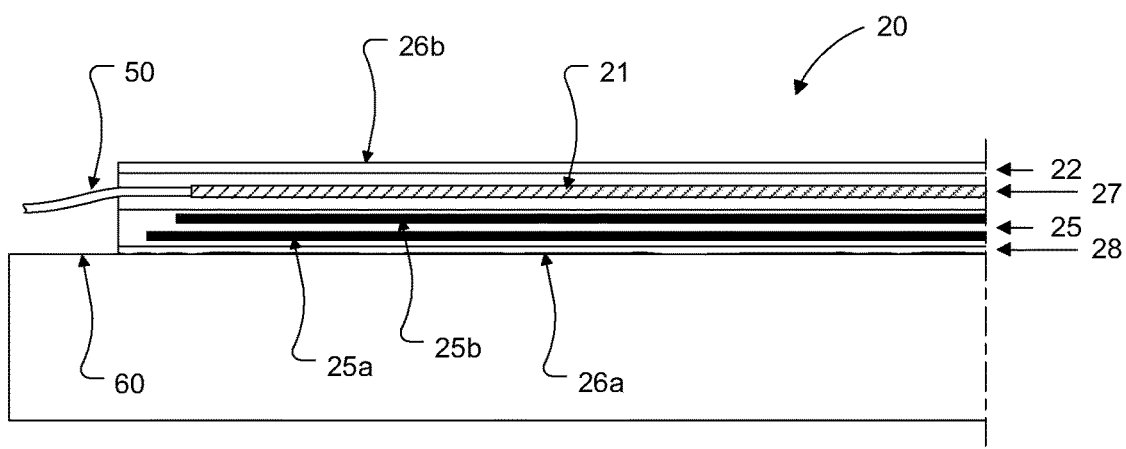
FIG. 4 illustrates schematically an exemplary embodiment of an antenna of the POS system.

FIG. 4 illustrates schematically a side view of an antenna of the POS system, and some of the internal components of the antenna. The antenna may be any of the antennas 20*a*-20*d* illustrated in the previous drawings and is generally denoted by reference numeral 20. Preferably, all antennas 20*a*-20*d* of the POS system are devised and configured in accordance with the antenna 20 illustrated in FIG. 4. The antenna matching circuit 23*a*-23*d* of each antenna 20*a*-20*d* illustrated in FIGS. 2-3 has been left out in FIG. 4 only for the purpose of not obscuring the drawing with unnecessary detail.

The antenna 20 comprises an electromagnetic shield 25 adapted to protect the internal circuitry of the antenna, including at least the antenna element 21, from magnetic and/or electromagnetic interference (EMI). EMI is basically disruptive electromagnetic energy which, if reaching the antenna 21 or the matching circuit 23, may disrupt proper operation of the external contactless card reader 20.

In particular, the electromagnetic shield 25 is configured to prevent or at least mitigate the negative effects otherwise caused by metal surfaces in the immediate vicinity of the antenna element 21. When placed on or close to a metal surface, the antenna element 21 may generate eddy currents in the metal surface, which eddy currents produce a magnetic flow that counteracts or disrupts the magnetic field of the antenna element 21. To prevent this, the electromagnetic shield 25 of the antenna 20 may comprise a metallic layer that shields the antenna element 21 from the underlying surface to ensure that the metal environment of the antenna 20 remains the same no matter where the antenna is placed or located. Preferably, the electromagnetic shield 25 further comprises a ferrite layer that shields the antenna element 21 from the metallic layer of the electromagnetic shield, so as to prevent "self-induced" eddy currents and disruptive magnetic flows from being produced by the metallic layer of the electromagnetic shield. By adapting the antenna element 21 and the antenna matching circuit 23*a*-*d* of the antenna (see FIGS. 2-3) to the metallic layer and the optional ferrite layer of the electromagnetic shield 25, proper operation of the antenna 20 can be maintained also in metal environments.

In the embodiment illustrated in FIG. 4, the antenna 20 is substantially flat and may have a thickness in the range of 0.5-5 mm. The antenna 20 has a bottom surface 26*a* that is intended to rest on, or be attached to, an underlying surface 60, such as a surface of a table or a checkout counter, and a top surface 26*b* intended to face a user of the antenna 20, i.e. a customer that is about to buy the product associated with the antenna 20 by tapping it with his portable payment device 30. The shape and size of the antenna 20 may vary in dependence of the intended use and location thereof, and the requirements of the antenna element 21. In typical applications, the antenna 20 may be substantially flat and have a substantially circular or substantially rectangular shape with a surface area in the range 1-100 cm2.

As illustrated in the drawing, the antenna 20 may be a substantially flat, multi-layer construction comprising a plurality of substantially parallel layers or elements providing the desired functionality of the antenna 20.

The main component of the antenna 20 is an antenna layer 27 comprising the antenna element 21 and, optionally, the antenna matching circuitry 23 (not shown). The antenna element 21 is typically a loop antenna. As shown in previous drawings, the antenna element 21 of the antenna layer 27 may be connected to the payment processor 10 via a physical feed line 50.

In this embodiment, the electromagnetic shield 25 is constituted by a shielding layer that is applied under the antenna layer 27, i.e. between the antenna layer 27 and the bottom surface 26*a* of the card reader 20, to shield the antenna layer 27 from the underlying surface 60. The electromagnetic shield 25 comprises a metallic layer 25*a* comprising an electrically conductive metal. The metallic layer 25*a* may, for example, comprise a metal sheet or a metal mesh. In one exemplary embodiment, the metallic layer 25*a* comprises an aluminium foil. The metallic layer 25*a* is preferably arranged to cover the entire antenna element 21, meaning that the antenna element 21 is arranged inside, and preferably well inside, the circumference of the metallic layer 25*a* in a direction perpendicular to the direction of propagation of the antenna layers.

Furthermore, the electromagnetic shield 25 comprises a ferrite layer 25*b*, arranged between the antenna layer 27 and the metallic layer 25*a*. The ferrite layer 25*b* may, for example, be constituted by a ferrite foil. The properties of the ferrite of effectively conducting magnetic flux while being a poor electrical conductor make the ferrite layer 25*b* prevent eddy currents from arising in the metallic layer 25*a* while ensuring proper operation of the antenna element 21. As illustrated in the drawing, the ferrite layer 25*b* is also arranged to cover the entire antenna element 21, meaning that the antenna element 21 is arranged inside the circumference of the ferrite layer 25*b* in a direction perpendicular to the direction of propagation of the antenna layers. Preferably, to effectively prevent eddy currents from arising in the metallic layer 25a, the antenna element 21 should be arranged entirely within the circumference of the ferrite layer 25b, such that the ferrite layer 25b extends outside of the circumference of the antenna element 21. At the same time it has been found that the ferrite layer 25b should not extend too much outside of the circumference of the antenna element 21 since this may negatively affect antenna field distribution and thus prevent proper operation of the antenna 20. The "ferrite overhang", i.e. the distance with which the ferrite layer 25b extends outside the circumference of the antenna element 21 as seen from a direction that is perpendicular to the antenna and ferrite layers, may depend on the properties of the antenna element 21, the metal layer 25a and the ferrite layer 25b, but should preferably be within the range of 1-10 mm. In some embodiments in which the antenna element 21 is an NFC loop antenna, an overhang of approximately 5 mm has been found suitable.

Consequently, according to some embodiments, the antenna 20 comprises a lower metallic layer 25a, a middle ferrite layer 25b arranged on top of the metallic layer 25a, and a top antenna layer 27 arranged on top of the ferrite layer 25b. Preferably, the surface areas of the layers increase in the order from top to bottom to optimize the operation of the antenna element 21. In this regard, the "surface area" of the antenna layer 27 refers to the surface area defined by the circumference of the antenna coil.

In the exemplary embodiment illustrated in FIG. 4, the antenna 20 is realised in form of a flat antenna sticker, e.g. an NFC reader sticker, and comprises an adhesive layer 28 applied to the bottom surface of the shielding layer 25 in order for the antenna 20 to be easily attached to the underlying surface 60. In this context it should be noted that the underlying surface 60 does not need to be horizontal and that the antenna 20 may be attached to virtually any surface. Also illustrated in the drawing is a cover 22 of the antenna 20, provided on top of the antenna layer 27. As mentioned above, the cover may, for example, comprise a picture or a symbol indicating to the customer that this is the tap zone where he should tap his portable payment device 30 if he would like to buy the product associated with the antenna 20.

It should be understood that the antenna 20 illustrated in FIG. 4 is just an exemplary embodiment according to which the antenna is intended to be placed on or adhered to a surface of another object. In other embodiments, one or more of the antennas 20a-20d of the POS system 1 may be configured to be integrated into other physical objects, such as a counter or a vending machine, in which case the antenna element 21 may be hidden under a radio transparent surface of the object.

Figure 5:
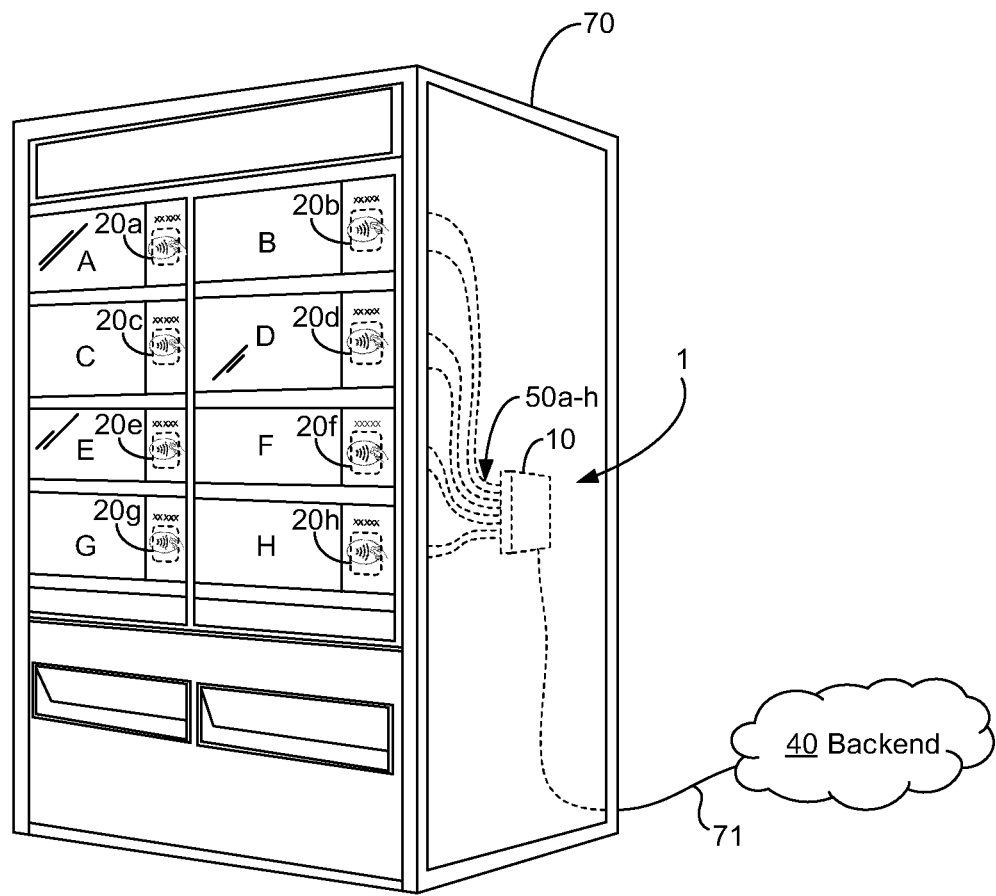
FIG. 5 illustrates schematically a vending machine comprising a POS system according to an exemplary embodiment of the present disclosure.

FIG. 5 illustrates an exemplary use of the POS system 1 disclosed herein. In this example, the POS system is incorporated into a vending machine 70 for automatic dispensing of products, such as snacks and beverages, to a paying customer. The vending machine 70 is a tap-to-buy-enabled vending machine, meaning that it allows a customer to select a product and pay for the product by a single tap of his portable payment device in a tap zone associated with the product.

The POS system 1 of the vending machine 70 is identical to the POS system illustrated in FIG. 2, except that the POS system of the vending machine comprises eight antennas 20a-20h that are connected to the payment processor 10 via a respective physical feed line 50a-h. Of course, the POS system of the vending machine can be provided with more or fewer antennas, depending on the number of products that are offered for sale via the vending machine.

Each antenna 20a-20h is associated with a respective product, stored in a product compartment A-H of the vending machine 70. Each antenna 20a-20h is associatively located in relation to its associated product and provided with a contactless symbol to indicate to the customer that a product can be bought simply by tapping its associated antenna with a portable payment device. For example, a product stored in product compartment A can be bought by tapping the contactless symbol of antenna 20a. When any of the antennas 20a-20h is tapped by a portable payment device, the payment-facilitating information is read by the antenna and sent to the payment processing unit 10 which, as described above, identifies the product to be paid for based on the antenna that has read the payment-facilitating information and initiates electronic payment of the product using the payment-facilitating information. This is typically achieved by the payment processor 10 by sending the payment-facilitating information together with information on the amount of the purchase, i.e. the price of the product, to the backend payment system 40. To allow the payment processor 10 to communicate with the backend system 40, the vending machine 70 may be connected to the Internet via a wired or wireless connection 71. When the backend payment system 40 has verified that the amount of the purchase is available on the customer's account, the payment processor 10 receives a verification message. Upon receipt of the verification message, the payment processor 10 sends a start signal to a vending machine controller (not shown) indicating that payment of the product has been verified, whereby the vending machine controller controls the vending machine mechanics so as to dispense the purchased product to the customer.

Figure 6:
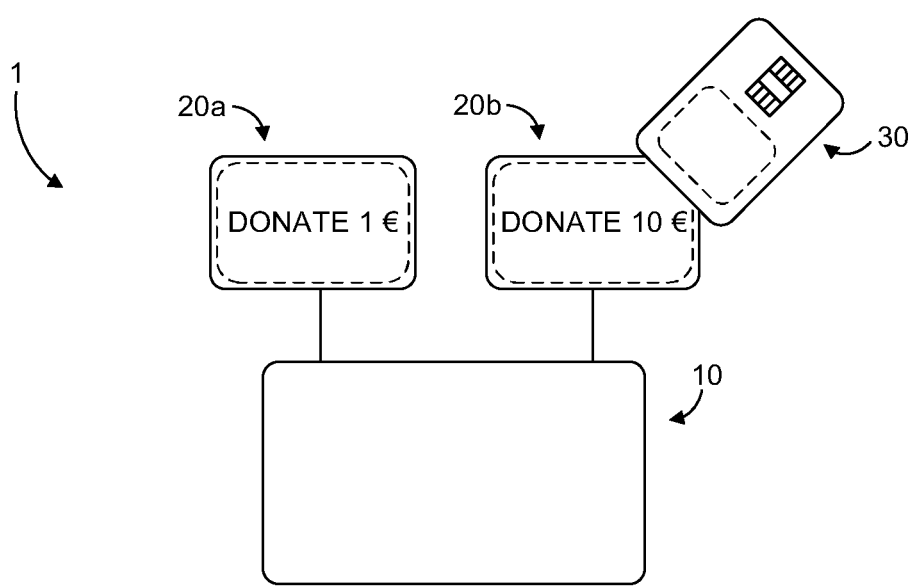
FIG. 6 illustrates schematically a donation system comprising a POS system according to an exemplary embodiment of the present disclosure.

FIG. 6 illustrates another exemplary use of the POS system 1 disclosed herein. In this embodiment, the POS system is used for collection of donations or gratuities (tip) and thus constitutes a donation system offering a simple way of donating money through a process which may be referred to as "tap-to-donate". The POS system 1 is identical to the POS system illustrated in FIG. 2 except that it comprises two antennas 20a-20b, each associated with a respective amount of money that is donated by a donor upon tapping the antenna with a portable payment device 30. Consequently, in this embodiment, the products associated with the antennas 20a-20b of the POS system 1 are donations of different amounts. This type of tap-to-donate system may advantageously be used by organisations or individuals collecting donations to charity. For example, it may be used for church collection, instead or in addition to collection plates or collection baskets. It may also be used as a wearable system by beggars on the street, for example in a "Contactless Payment Jacket", similar to the Contactless Payment Jacket developed by the Amsterdam-based advertising agency "N=5", see. e.g. http://bitcoinist.com/amsterdam-homeless-war-cash/ (2017-02-24). The proposed tap-to-donate system could also be used for tip collection by bars and restaurants. For example, the POS system may be installed in a bar and the antennas 20a-20b of the POS system 1 may be located at or near the bar counter, provided with text, images or symbols clearly indicating to bar customers that a pre-specified amount of tip can be donated by tapping one of the antennas 20a-20b with a portable payment device.

Figure 7:
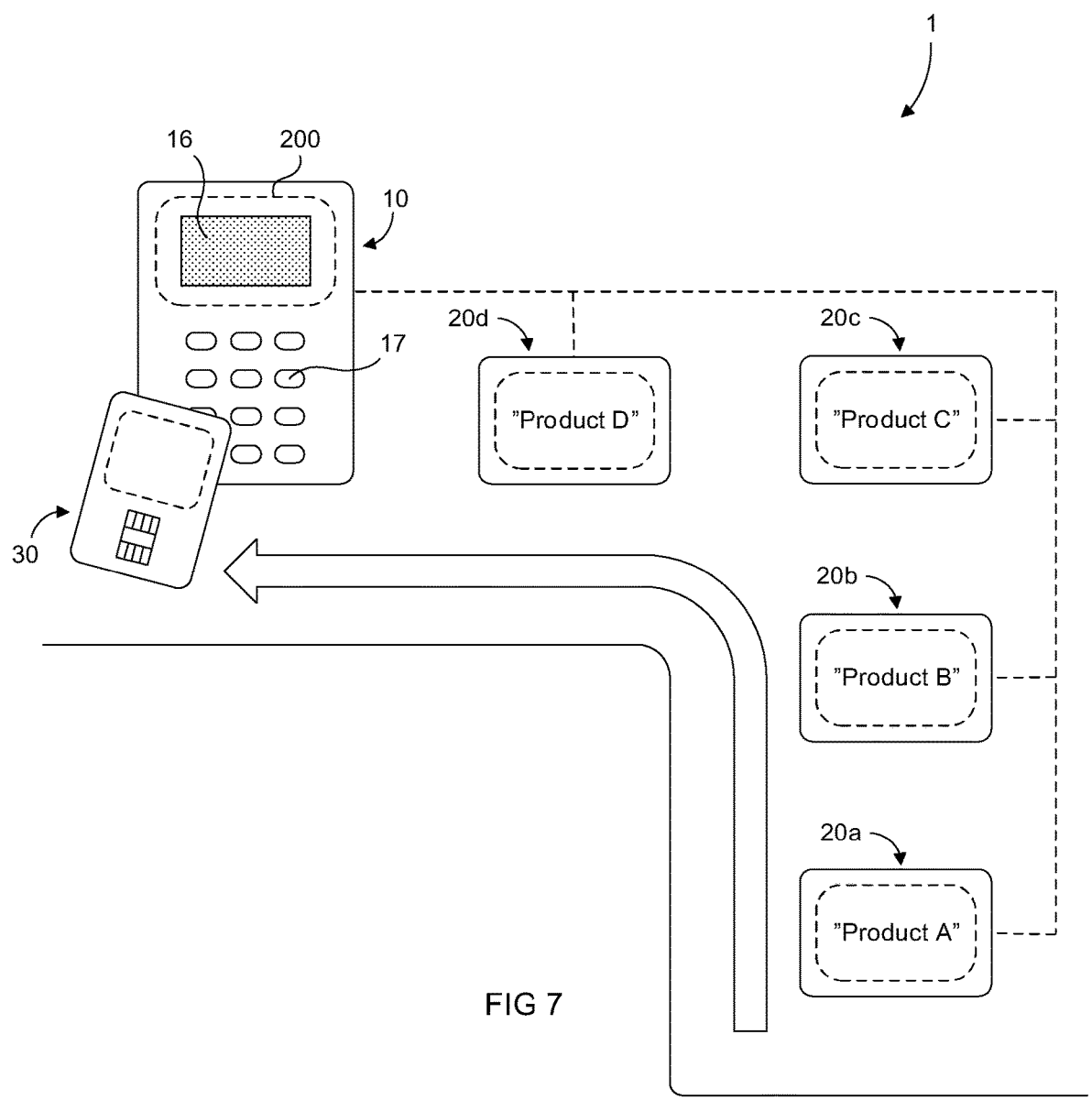
FIG. 7 illustrates schematically a POS system according to an exemplary embodiment in which the POS system is equipped with a checkout antenna.

FIG. 7 illustrates another embodiment and another exemplary use of the POS system 1 disclosed herein. Like in previous embodiments, the POS system comprises a plurality of antennas 20a-20d, each associated with a respective product that may be selected by a customer by tapping his portable payment device 30 on the antenna. In this embodiment, however, the POS system 1 further comprises a checkout antenna 200 intended to be tapped by the portable payment device 30 of the customer after tapping one or more of the other antennas 20a-20d. The checkout antenna 200 may be an external antenna of the payment processor 10 but may also, as illustrated in the drawing, be an internal antenna of the payment processor 10. The main purpose of the checkout antenna 200 is to indicate to the payment processor 10 that the customer has made his selection of products and is ready to pay. A checkout antenna 200 may be advantageously used in POS systems installed at point of sales where customers follow a well-defined path during the process of product selection. For example, POS systems with a checkout antenna may be advantageously used in fast-food restaurants or tray-lunch restaurants where customers are made to follow a path, illustrated by a white arrow in FIG. 7, along which they are exposed to products available for purchase. The checkout antenna 200 may thus be located at a checkout location at the point of sale, which checkout location is situated at the end of a path along which customers are made to move during the process of product selection.

When a customer taps the checkout antenna 200, the payment processor 10 may be configured to compare the payment-facilitating information read from the payment-device 30 by the checkout antenna 200 with payment-facilitating information previously read by product-antennas 20a-20d of the POS system, i.e. antennas associated with a respective product. From this comparison, the payment processor 10 can identify one or more antennas 20a-20d that have been tapped by the same payment device 30 on the way towards the checkout location, and thus the products to be paid for using the payment-facilitating information.

Preferably, in this embodiment, the POS system is configured such that the financial transaction comprising the electronic payment of the selected products is initiated upon receipt of payment-facilitating information from the checkout antenna 200 and not upon receipt of payment-facilitating information from a product-antenna 20a-20d. In this way, only one financial transaction has to be carried out for each customer. Consequently, in this embodiment, the product-antennas 20a-20d are used to allow the customer to select the products to be paid for using the portable-payment device 30 to be subsequently used for payment of the products at the checkout location.

As illustrated in the drawing, the payment processor 10 may be adapted for user authentication, i.e. for verifying that the customer is the rightful owner of the portable payment device 30. In this exemplary embodiment, the payment processor 10 is configured for user authentication through PIN (Personal Identification Number) verification, meaning that the payment processor 10 is configured to receive a PIN from the customer, entered on a PIN device of the POS system 1, which PIN is used by the payment processor 10 or a backend payment system (not shown) to which the payment processor is connected to authenticate the identity of the customer. The PIN device may be comprised in the payment processor 10, which may then include a display 16 and a keypad 17 for PIN entry, or be provided as a separate PIN device that is communicatively connectable to the payment processor 10, either directly or via the backend payment system. Alternative PIN-based payment-device verification methods may also be employed by the POS system 1, such as the method disclosed in U.S. Pat. No. 8,868,462 using an ordinary mobile phone for PIN authorized EMV payments. As known by the skilled reader, there are various methods for user authentication and it should be appreciated that the POS system of the present disclosure may be configured to employ any known type of user authentication procedure.

It should also be appreciated that the feature of user authentication is not limited to embodiments of the POS systems comprising a checkout antenna 200. Devices and processes for user authentication, such as PIN devices and PIN verification processes, may be comprised and implemented also in embodiments of the POS systems 1 illustrated in previous drawings. For example, the vending machine in FIG. 7 may comprise a PIN device for user authentication based on a PIN that is entered on the PIN device by the customer. Likewise, the payment processor 10 illustrated in FIG. 1, 2, 3 or 6 may comprise or be communicatively connectable to a PIN device for PIN verification of the portable payment device 30.

FIGS. 8-10 illustrate three different ways of implementing the payment process in the multi-antenna POS system 1 of the present disclosure. The drawings illustrate an exemplary scenario where a customer selects products for purchase by tapping the antennas denoted 20b and 20d of the POS system illustrated in any of the previous drawings with a portable payment device 30, such as a contactless debit or credit card.

FIG. 8 illustrates a payment process which may be referred to as "pay-per-tap", where a financial transaction including electronic payment of the product associated with the tapped antenna is initiated directly upon tap of the antenna. In a first step, S81, the customer taps the antenna 20b with the payment device 30, whereby payment-facilitating information is read from the payment device by the antenna. In a second step, S82, the antenna 20b transmits the payment-facilitating information to the payment processor 10. The payment processor 10 may then identify the product to be paid for based on the antenna from which the payment-facilitating information was received, as discussed above, and retrieve product related information including, e.g., the price of the product from a local or remote POS software application. In a third step, S83, the payment processor 10 initiates electronic payment of the identified product by sending the payment-facilitating information and the product related information to the backend payment system 40. In an optional step S84, the backend payment system 40 may send a payment verification message to the payment processor 10 after having verified that the amount of the purchase is available on the account associated the payment-facilitating information read from the portable payment device 30 of the customer. When the second antenna 20d is tapped by the customer in step S85, a second and separate payment process that is independent from the first payment process initiated by the tapping of the first antenna 20b is initiated. Steps S86-S88 of the second payment process corresponds to steps S82-S84 of the first payment process.

Consequently, in the pay-per-tap payment process, one financial transaction comprising electronic payment of a product is initiated for each tap of an antenna of the POS system. This type of payment process may be suitable for POS systems of vending machines, donation systems or other points of sales where the customer is assumed to tap only one or a few antennas of the POS system. It may also be suitable for POS systems at point of sales where the total purchase amount rarely exceeds a limit for user authentication, i.e. an amount that, when exceeded, requires the customer to prove that he is the rightful owner of the portable payment device through a user authentication process, such as a PIN verification process.

FIG. 9 illustrates a payment process which may be referred to as "pay-upon-timeout", where a single financial transaction including electronic payment of products associated with antennas that have been tapped is initiated upon timeout or expiry of a timer. In this case, a first tap of an antenna by a portable payment device causes the payment processor 10 to open up a time window for product selection by starting a timer. If the same antenna or another antenna of the POS system is tapped with the same payment device before the time window closes (i.e., before expiry of the timer), the timer is restarted and so the time window is extended. When the timer finally expires, the payment processor 10 is configured to initiate a single electronic payment of all products associated with an antenna that has been tapped by the portable payment device within the time window (i.e. since the timer was first started). In this way, only one financial transaction has to be performed no matter the number of products purchased by the customer.

With reference now made to the exemplary scenario illustrated in FIG. 9, the customer taps the antenna 20b in a step S91, whereby payment-facilitating information is read from the portable payment device 30 by the antenna. In a second step, S92, the payment-facilitating information is transmitted to the payment processor 10. Upon receipt of the payment-facilitating information by the payment processor 10, the controller 12 of the payment processor starts a timer. This is performed in step S93. Furthermore, the controller 12 associates the timer with the payment-facilitating information to create a logical link between the portable payment device 30 of the customer and a time window during which the same portable payment device can be further used without payment being initiated. The timer, denoted by reference numeral 122 in FIG. 9, may, for example, be an internal timer of the controller 12. The controller 12 also identifies and registers the product associated with the antenna 20b from which the payment-facilitating information was received. The registration of the product by the controller 12 of the payment processor 10 comprises a step of associating the product with the payment-facilitating information. This step may be regarded as a step of putting the product in a virtual shopping cart, the products of which are linked to the customer through association with the payment-facilitating information of the customer's payment device 30. In step S94, the customer taps the second antenna 20d, which, in a subsequent step S95, causes the payment-facilitating information to be sent to the payment processor 10. The controller 12 compares the payment-facilitating information with previously received payment-facilitating information to identify any timer already associated with the payment-facilitating information. Upon identification of the timer that was started in step S93, the controller 12 restarts the timer in step S96, whereby the time window for product selection is extended. The controller 12 also identifies and registers the product associated with the tapped antenna 20d, and adds the product to the virtual shopping cart by associating the product with the payment-facilitating information. In step S97, the timer expires and, in response thereto, the controller 12 initiates the financial transaction by, in step S98, sending the payment-facilitating information together with product related information related to all the registered products (i.e., all products in the virtual shopping cart) to the backend payment system 40. In order to allow all products to be paid through a single financial transaction, the product related information sent to the backend system 40 should comprise the total price of the registered products, or at least information from which the total price of the products can be derived by the backend payment system 40. In a subsequent step S99, the backend payment system 40 may send a payment verification message to the payment processor 10 after having verified that an amount corresponding to the total price of the registered products is available on the account associated the payment-facilitating information read from the portable payment device 30 of the customer.

FIG. 10 illustrates the payment process described above with reference to FIG. 7, which payment process may be referred to as "pay-upon-checkout". This payment process may be performed by a POS system equipped with a plurality of antennas for selection of products (i.e., a plurality of "product antennas") and at least one antenna serving as a checkout antenna, positioned at a checkout location of the point of sale.

In a first step S101, the customer taps the antenna 20b with the payment device 30, whereby payment-facilitating information is read from the payment device by the antenna. In a second step, S102, the antenna 20b transmits the payment-facilitating information to the payment processor 10. In response to reception of the payment-facilitating information, the payment processor 10 identifies the product associated with the tapped antenna 20b and puts the product in the customer's virtual shopping cart by associating it with the received payment-facilitating information. When the customer taps the second antenna 20d in step S103, the process is repeated and, in step S104, the product associated with the second antenna 20d is added to the virtual shopping cart. When the customer has selected which products to buy, the customer taps the checkout antenna 200 of the POS system, whereby the payment-facilitating information is read from the payment device 30 by the checkout antenna 200 in step S105. In step S106, the payment-facilitating information is sent from the checkout antenna 200 to the payment processor 10 which, in response to reception of the payment-facilitating information from the checkout antenna 200, is configured to initiate a financial transaction comprising electronic payment of all products in the customer's virtual shopping cart. Steps S107 and S108 correspond to steps S98 and S99 in FIG. 9 and involve communication between the payment processor 10 and the backend payment system 40 to facilitate and verify the electronic payment of the products.

In the illustrative examples of the foregoing description, a varying number of antennas have been used in the multi-antenna POS system. As already mentioned, the number of antennas of the POS system is preferably adjustable by the user, e.g. a merchant, in order for the user to adapt the POS system to a particular point of sale and the range of products offered for sale at the point of sale.

Typically but not necessarily, the POS system comprises 2-20 antennas, and more preferably 2-10 antennas. In order for the user to setup and adjust the POS system as desired, the payment processor 10 may comprise a number of antenna input ports, for example ten or twenty antenna input ports. Furthermore, as briefly discussed above, the POS system may comprise an administration interface, implemented in software that is stored in the payment processor 10 or in the cloud (i.e. on a server that is accessible via the Internet), through which the user may setup the POS system by associating each antenna port of the payment processor 10 with a respective product that should be offered for sale. The administration interface may be part of a bigger POS application, often used by merchants to organise their product library and sales history. The administration interface may be configured such that the user is allowed to associate a product in the product library with an antenna port of the payment processor 10. By connecting a desired number of antennas to antenna input ports of the payment processor, and associating the connected antenna input ports with a respective product, a flexible and customizable POS system is made available to the user.

FIG. 11 is a flowchart illustrating the tap-to-buy process disclosed herein, i.e. a method for contactless payment of products allowing a customer to select and pay for one or more of a plurality of products by tapping one or more of a plurality of antennas, each associated with a respective product.

In a first step, S111, there is provided a plurality of antennas, each associated with a respective product.

In a second step, S112, payment facilitating information is read by one of the plurality of antennas in response to a tap of the antenna by a portable payment device in which the payment-facilitating information is embedded.

In a third step, S113, a product to be paid for is identified based on which of the plurality of antennas read the payment-facilitating information. As discussed above, this step may be performed by a payment processor for receiving and processing payment-facilitating information read by any of the antennas, e.g. by identifying the antenna from which the payment-facilitating information was received and identifying the product associated with the antenna by use of a look-up table associatively storing antenna identification information and product identification information.

In a fourth step, S114, a financial transaction comprising electronic payment of the identified product using the payment-facilitating information read from the portable payment device is facilitated. As discussed above, this step may also be performed by the payment processor, e.g. by transmitting the payment-facilitating information and product related information comprising at least the price of the identified product to a backend payment system for carrying out the financial transaction.

The example embodiments provided herein have been presented for the purpose of illustration. The description is not intended to be exhaustive and the example embodiments are not limited to the precise form disclosed. Various modifications and variations of the example embodiments are possible in light of the above teachings. The examples discussed herein were chosen and described in order to explain the principles and the nature of the proposed POS system in order to enable one skilled in the art to utilize and modify the example embodiments in various manners so as to adapt the teachings to the particular use contemplated. The features of the embodiments described herein may be combined in all possible combinations of methods, apparatuses, modules, systems, and computer program products. It should be appreciated that the example embodiments presented herein may be practiced in any combination with each other. It should also be appreciated that the example embodiments may be implemented at least in part by means of both hardware and software, and that several "means", "units" or "devices" may be represented by the same item of hardware.

The invention claimed is:

1. A point of sale [POS] system for contactless payment of products, comprising:
   a plurality of antennas, wherein at least one antenna of the plurality of antennas is associated with a product and is configured to read payment-facilitating information from a portable payment device when the portable payment device is brought in the vicinity of the at least one antenna; and
   a payment processing unit for facilitating electronic payment of products based on payment-facilitating information received from a portable payment device, wherein the payment processing unit is coupled to the plurality of antennas, wherein the payment processing unit is configured to:
   upon reading of payment-facilitating information by the at least one antenna of the plurality of antennas, receive the payment-facilitating information,
   register a plurality of products selected for purchase by a customer based on the at least one antenna of the plurality of antennas reading the payment-facilitating information, and characteristics or content of respective signals carrying the payment-facilitating information from respective antennas to the payment processing unit; and
   initiate a single financial transaction comprising electronic payment for all the registered products, in response to:
   a) reception of payment-facilitating information by the at least one antenna of the plurality of antennas;
   b) expiry of a timer that is started upon reception of payment-facilitating information by the at least one antenna of the plurality of antennas;
   or
   c) reception of payment-facilitating information from an antenna of the plurality of antennas constituting a checkout antenna of the POS system.

2. The POS system according to claim 1, wherein the payment processing unit is further configured to identify the product to be paid for based on an antenna input port on which the payment-facilitating information is received.

3. The POS system according to claim 1, further comprising a POS software application configured to enable a user of the POS system to associate the plurality of antennas with a respective product.

4. The POS system according to claim 1, wherein the antennas are connected to the payment processing unit through physical feed lines via which the payment-facilitating information is sent to the payment processing unit.

5. The POS system according to claim 4, wherein
   the antennas are configured to send analogue signals carrying the payment-facilitating information to the payment processing unit via the physical feed lines, and the payment processing unit comprises an A/D converter for digitizing the analogue signals, located in a secure area of the payment processing unit.

6. The POS system according to claim 1, wherein the portable payment device is a contactless debit or credit card, or a mobile communication device adapted for mobile proximity payments, such as a mobile phone.

7. The POS system according to claim 1, wherein the payment processing unit is configured for user authentication.

8. The POS system according to claim 1, wherein the payment processing unit is configured to facilitate the single financial transaction in the form of an EMV transaction meaning that the single financial transaction fulfils the requirements of the EMV (Europay, Mastercard, Visa) standard.

9. A method comprising:
   receiving, at a payment processing unit when a portable payment device is brought in the vicinity of at least one antenna of a plurality of antennas at different locations, payment-facilitating information from the portable payment device with the at least one antenna, wherein the at least one antenna is associated with a product;

registering a plurality of products selected for purchase by a customer based on the at least one antenna of the plurality of antennas reading the payment-facilitating information, and characteristics or content of respective signals carrying the payment-facilitating information from respective antennas to the payment processing unit; and initiating a single financial transaction comprising electronic payment for all the registered product upon any of:
  a) reception, in a payment processing unit, of payment-facilitating information from any of the plurality of antennas,
  b) expiry of a timer that is started upon reception of payment-facilitating information from any of the plurality of antennas, and
  c) reception, in a payment processing unit, of payment-facilitating information from an antenna constituting a checkout antenna.

10. The method according to claim 9, wherein registering a plurality of products selected for purchase by a customer further includes identifying an antenna input port on which the payment-facilitating information is received by a payment processing unit, and identifying the plurality of products based on the identified antenna input port.

* * * * *